(12) United States Patent
Clawson et al.

(10) Patent No.: US 9,063,405 B2
(45) Date of Patent: *Jun. 23, 2015

(54) BLOWER NOISE MUFFLER APPARATUS AND SYSTEM

(75) Inventors: Marcus J. Clawson, American Fork, UT (US); Stuart C. Farmer, Orem, UT (US); Kristen E. Bishop, Lindon, UT (US)

(73) Assignee: Open Air Cinema LLC, Orem, UT (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/205,493

(22) Filed: Sep. 5, 2008

(65) Prior Publication Data
US 2010/0008798 A1    Jan. 14, 2010

Related U.S. Application Data

(60) Provisional application No. 61/079,803, filed on Jul. 10, 2008.

(51) Int. Cl.
*F04B 39/12* (2006.01)
*G03B 21/58* (2014.01)

(52) U.S. Cl.
CPC ...................................... *G03B 21/58* (2013.01)

(58) Field of Classification Search
USPC .................. 417/313, 572; 181/198, 200, 205
See application file for complete search history.

(56) References Cited

U.S. PATENT DOCUMENTS

| | | | |
|---|---|---|---|
| D219,408 S | 12/1970 | Frish | |
| 3,720,455 A | 3/1973 | Sahlin | |
| 4,022,522 A * | 5/1977 | Rain | 359/443 |
| 4,258,821 A * | 3/1981 | Wendt et al. | 181/202 |
| 4,323,301 A | 4/1982 | Spector | |
| 4,369,591 A | 1/1983 | Vicino | |
| 4,802,734 A | 2/1989 | Walter | |
| 5,116,273 A | 5/1992 | Chan | |
| 5,274,200 A * | 12/1993 | Das et al. | 181/202 |
| 5,553,908 A | 9/1996 | Shink | |
| 5,567,127 A * | 10/1996 | Wentz | 417/312 |
| 5,672,052 A * | 9/1997 | Ishida et al. | 417/312 |
| 5,929,394 A * | 7/1999 | Westerbeke, Jr. | 181/204 |

(Continued)

FOREIGN PATENT DOCUMENTS

WO    WO2008065400    6/2008

OTHER PUBLICATIONS

U.S. Appl. No. 61/024,492, filed Jan. 29, 2008, Farmer et al.

(Continued)

*Primary Examiner* — Christopher Bobish
(74) *Attorney, Agent, or Firm* — Workman Nydegger

(57) ABSTRACT

A system for dampening sound produced by an air blower such as that used to inflate an inflatable movie screen or other inflatable structures. The system can include an air blower and a muffler. The muffler is configured to reduce or dampen sound output from the air blower and includes one or more surfaces that enclose at least a portion of the blower. An opening may be formed in the muffler to facilitate air flow into the air blower. The blower can include a fan and the opening may allow air to pass through into a space in the interior of the muffler and to the fan, so that it can be output to the inflatable movie screen. The muffler may also include a second opening. The second opening can facilitate output of the air by the blower and to the inflatable movie screen.

7 Claims, 4 Drawing Sheets

(56) References Cited

U.S. PATENT DOCUMENTS

| | | | |
|---|---|---|---|
| 6,008,938 A * | 12/1999 | Suehle et al. | 359/443 |
| 6,039,547 A * | 3/2000 | Hendrix et al. | 417/234 |
| 6,145,616 A * | 11/2000 | Ewanek | 181/224 |
| 6,447,264 B1 * | 9/2002 | Lucas et al. | 417/313 |
| 6,668,475 B2 | 12/2003 | Carolan | |
| 6,739,725 B2 | 5/2004 | Ben-Ari | |
| 6,874,263 B2 | 4/2005 | Ohmuku | |
| 7,006,154 B2 | 2/2006 | Dudkowski | |
| 7,181,877 B2 | 2/2007 | Quade | |
| 7,316,257 B2 | 1/2008 | Cameron | |
| 7,397,603 B2 | 7/2008 | Peterson | |
| 7,446,937 B2 | 11/2008 | Poretskin | |
| 7,490,426 B2 | 2/2009 | Scarberry | |
| 7,490,697 B1 * | 2/2009 | Williamson, Jr. | 181/200 |
| D593,591 S | 6/2009 | Hochendoner | |
| D608,406 S | 1/2010 | Cobb, II et al. | |
| 7,716,876 B2 | 5/2010 | Wiegand et al. | |
| 7,874,400 B2 * | 1/2011 | Teisseyre | 181/200 |
| 7,878,772 B2 * | 2/2011 | Rexhauser et al. | 417/368 |
| 7,942,533 B2 | 5/2011 | Ganzevoort | |
| 7,961,388 B1 | 6/2011 | Deutsch | |
| 8,042,292 B2 | 10/2011 | Gibb | |
| 8,045,264 B2 | 10/2011 | Elliot | |
| 8,047,257 B2 | 11/2011 | McIntosh | |
| D654,945 S | 2/2012 | Giammarinaro | |
| 8,243,366 B1 | 8/2012 | Deutsch | |
| 8,254,024 B2 | 8/2012 | Giammarinaro | |
| 8,511,365 B2 | 8/2013 | McIntosh | |
| 8,763,291 B1 | 7/2014 | Nichols | |
| 8,769,881 B2 | 7/2014 | O'Farrill Haro | |
| 2003/0014757 A1 | 1/2003 | Craven | |
| 2004/0123782 A1 | 7/2004 | Korber | |
| 2005/0083486 A1 | 4/2005 | Johnson | |
| 2005/0083651 A1 | 4/2005 | Smith | |
| 2005/0135068 A1 | 6/2005 | Huff | |
| 2005/0202714 A1 | 9/2005 | Strayer | |
| 2006/0169607 A1 | 8/2006 | Carnevali | |
| 2006/0285836 A1 | 12/2006 | Coppola | |
| 2007/0086088 A1 | 4/2007 | Astill | |
| 2009/0242148 A1 | 10/2009 | Zheng | |
| 2009/0298385 A1 * | 12/2009 | Brinckerhoff | 446/487 |

OTHER PUBLICATIONS

U.S. Appl. No. 61/149,811, filed Feb. 4, 2009, Farmer et al.
U.S. Appl. No. 61/079,800, filed Jul. 10, 2008, Clawson et al.
U.S. Appl. No. 61/079,803, filed Jul. 10, 2008, Clawson et al.
U.S. Appl. No. 12/205,465, filed Sep. 5, 2008, Clawson et al.
U.S. Appl. No. 12/697,811, filed Feb. 1, 2010, Farmer et al.
U.S. Appl. No. 12/205,465, Jun. 23, 2010, Office Action.
U.S. Appl. No. 12/697,811, Mar. 7, 2012, Office Action.
U.S. Appl. No. 12/205,465, Dec. 9, 2010, Notice of Allowance.
U.S. Appl. No. 12/697,811, Aug. 7, 2012, Office Action.
U.S. Appl. No. 12/697,811, Apr. 25, 2013, Office Action.
U.S. Appl. No. 12/697,811, Oct. 10, 2014, Office Action.
U.S. Appl. No. 12/697,811, Dec. 18, 2013, Final Office Action.
U.S. Appl. No. 61/927,882, filed Jan. 2014, Farmer.
U.S. Appl. No. 14/289,846, filed Jan. 16, 2015, Notice of Allowance.

* cited by examiner

BLOWER NOISE MUFFLER APPARATUS AND SYSTEM

CROSS-REFERENCE TO RELATED APPLICATIONS

This application claims the benefit of, and priority to, U.S. Provisional Patent Application Ser. No. 61/079,803, filed Jul. 10, 2008, and entitled BLOWER NOISE MUFFLER APPARATUS AND SYSTEM, which application is expressly incorporated herein by this reference.

BACKGROUND OF THE INVENTION

1. The Field of the Invention

The present invention relates generally to systems and apparatus related to noise reduction. More particularly, embodiments of the invention relate to mufflers for reducing noise output by blowers used to inflate inflatable structures (e.g., movie screens).

2. The Relevant Technology

Inflatable movie screen technology is revitalizing the movie industry and allowing large numbers of people to view movies in almost any forum and venue. Almost any location—whether indoor or outdoor—now has cinema potential and can now be used for movie viewing. Moreover, the ability to create inflatable screens in any size can allow inflatable movie screen technology to be placed in a park, a stadium, or even on a rooftop for viewing by thousands of people, while the same technology may also be used in a backyard for viewing by only a handful of people.

In general, inflatable movie screens include an inflatable support structure, a projection screen, and an air blower. The air blower is generally configured to push air into the inflatable support structure, and cause it to inflate. Such blowers may be integral within the inflatable support structure or may be removably attached thereto.

In many cases, inflatable movie screens are adapted to use continuous air flow, such that to maintain the screen inflated during use, the air blower must constantly, or almost constantly, be activated and pushing air into the inflatable structure. Such air blowers generally cause a level of noise that has the potential to disrupt the viewing of a movie or other presentation, particularly if a viewer is positioned near the screen and/or air blower.

A similar feature is observed with other inflatable structures, whether such are used indoors or outdoors. For example, inflatable structures are often made of PVC or nylon, and can be constructed to operate as bounce houses, playground equipment, and the like. Such may also use blowers to inflate the structure, which blower can cause a level of noise that is undesired.

Accordingly, there is a continuing desire for new and improved apparatus and systems that allow users to reduce the noise heard from an air blower used to inflate an inflatable structure such as, but not limited to, a movie screen for viewing a movie. Such noise reduction can benefit a viewer in an outdoor or indoor environment, and can reduce noise whether the inflatable structure is a closed or open air system, and whether the air blower is configured for continuous or intermittent use, or even for use only in initially inflating an enclosed air inflatable structure.

BRIEF SUMMARY OF THE INVENTION

The principles of the present invention relate to systems and apparatus related to noise reduction. More particularly, exemplary systems and apparatus relate to reducing noise associated with an air blower used to inflate an inflatable movie screen.

According to one embodiment, a blower muffler system includes an air blower and a muffler. The muffler may be configured to reduce sound output heard from the air blower as generated by, for example, vibrations, a fan, a motor, air speed, air flow, and the like. The muffler itself can include one or more surfaces enclosing at least a portion of the blower. Such surfaces may have one or more openings through which air may be input to the air blower.

In another embodiment, a muffler system is disclosed to reduce sound output of an air blower, and includes an air blower and muffler. The air blower is adapted to receive air at an inlet and to output air at an outlet. The air blower can include a fan for drawing air into the blower through the air inlet. The muffler can be adapted to dampen sound output by the blower, and can include surfaces that can be positioned around and substantially enclose the air blower. The muffler includes a sound attenuation material and an aperture. The aperture is configured to facilitate air flow from an environment and to the air inlet of the blower.

Another embodiment includes an inflatable movie screen system that includes an inflatable support structure and a projection surface coupled to the inflatable support structure. An air inlet is coupled to the inflatable support structure and configured to receive air for inflation of the inflatable support structure. An air blower is coupled to the air inlet for providing air through the inlet and to the inflatable support structure. A muffler may also be positioned around at least some, all, or nearly all, of the air blower, and can provide a dampened effect to sound generated by the air blower.

These and other objects and features of the present invention will become more fully apparent from the following description and appended claims, or may be learned by the practice of the invention as set forth hereinafter.

BRIEF DESCRIPTION OF THE DRAWINGS

To further clarify aspects and features of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

It is to be understood that the drawings are diagrammatic and schematic representations of such exemplary embodiments. While the figures illustrate embodiments of the invention according to one scale, it will be appreciated that they are not limiting of the present invention, and are not necessarily drawn to scale for all embodiments of the invention. In particular, unless specifically claimed, no particular size, shape or other configuration is required.

In the following description, numerous specific details are set forth in order to provide a thorough understanding of the present invention. It will be obvious, however, to one skilled in the art that the present invention may be practiced without these specific details. In other instances, well-known aspects of inflatable movie screens, air blowers, and sound attenuation materials have not been described in particular detail in order to avoid unnecessarily obscuring the present invention.

General Inflatable Screen System

Figure 1:
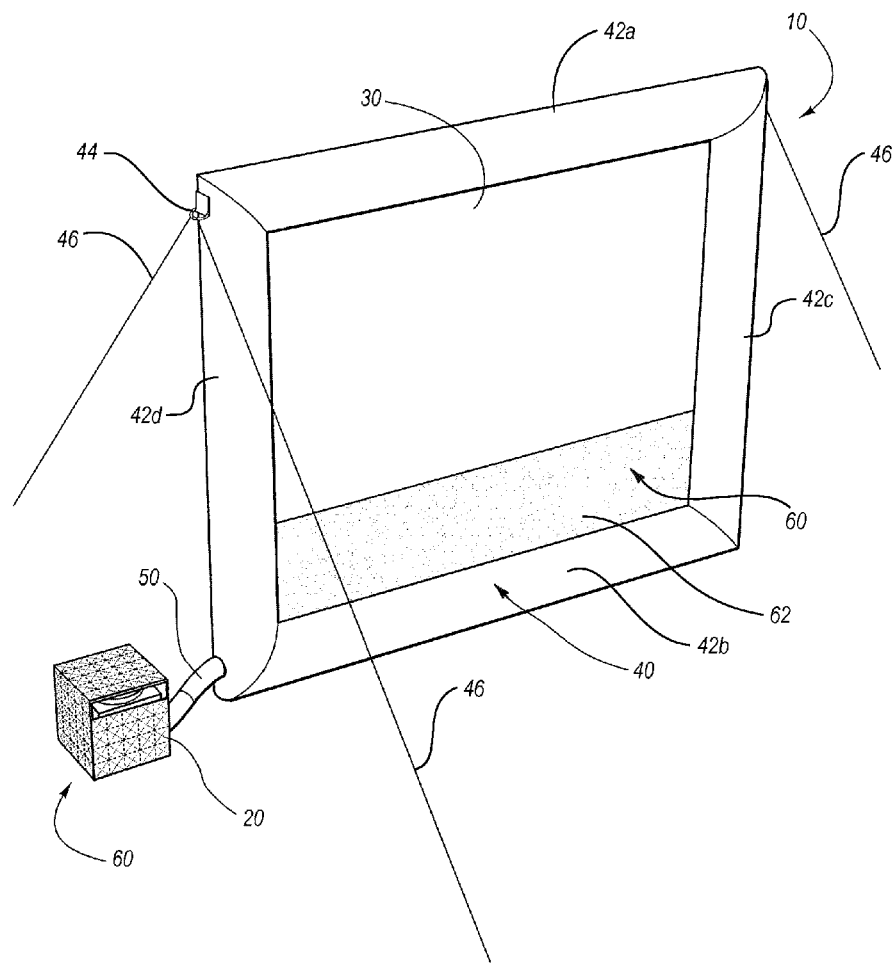
FIG. 1 illustrates a rear perspective view of an example inflatable movie screen system having an air blower with an installed muffler, according to one aspect of the present invention.

With reference to FIG. 1, an inflatable screen system 10 is illustrated. In the illustrated example, inflatable screen system 10 is configured to be inflated by an air blower 20. in particular, inflatable screen system 10 includes an inflatable supports structure 40 that is connected to air blower 20. Air blower 20 can thereby, when turned on, push air into and inflate support structure 40.

Inflatable screen system 10 also includes a screen 30 is removably or permanently affixed to support structure 40, and which acts as a projection surface for a movie or other presentation. With support structure 40 inflated, the movie or other presentation can be projected by front or rear projection onto screen 30. As will be appreciated, inflatable screen system 10 is merely representative of any number of different types of inflatable screens that may be used in connection with aspects of the present invention. Some non-limiting examples of such suitable screens may further be found, for example, in U.S. Pat. No. 7,920,326, filed concurrently herewith and entitled "INFLATABLE SCREEN WITH FULLY INTERNAL TENSION," which is incorporated herein in its entirety by this reference.

As further shown in FIG. 1, support structure 40 is configured to receive air from blower 20 through an air inlet 50. Air inlet 50 is, in this embodiment a blower tube or inflation point and is coupled to support structure 40 as well as to an external and removable blower 20, although it will be appreciated that this is exemplary only. For example, in other embodiments, air inlet 50 and/or blower 20 may be integrally formed within support structure 40. Moreover, although a single air inlet 50 and blower 20 is illustrated, this is exemplary only and in other embodiments there may be two or even more air inlets and/or blowers.

Muffler for Air Blower

As is also illustrated in FIG. 1, blower 20 may be enclosed within a muffler 60 which may be used for sound attenuation purposes to silence or dampen the sound produced by air blower 20. In this example, air blower 20 is an external blower which is optionally selectively removable from inflatable screen system 10 and/or air inlet 50. It will be appreciated in view of the disclosure herein, however, that a muffler 60 may also be adapted to fit around an internal and/or integral air blower to dampen or stifle the sound produced by such a blower.

In the illustrated example of a muffler 60 that is used in connection with an external air blower 20, it can be seen that muffler 60 is positioned so as to enclose substantially all of air blower 20. In general, the more of air blower 20 that is enclosed, the more effective muffler 60 can be at dampening the sound emitted from blower 20.

Figure 2:
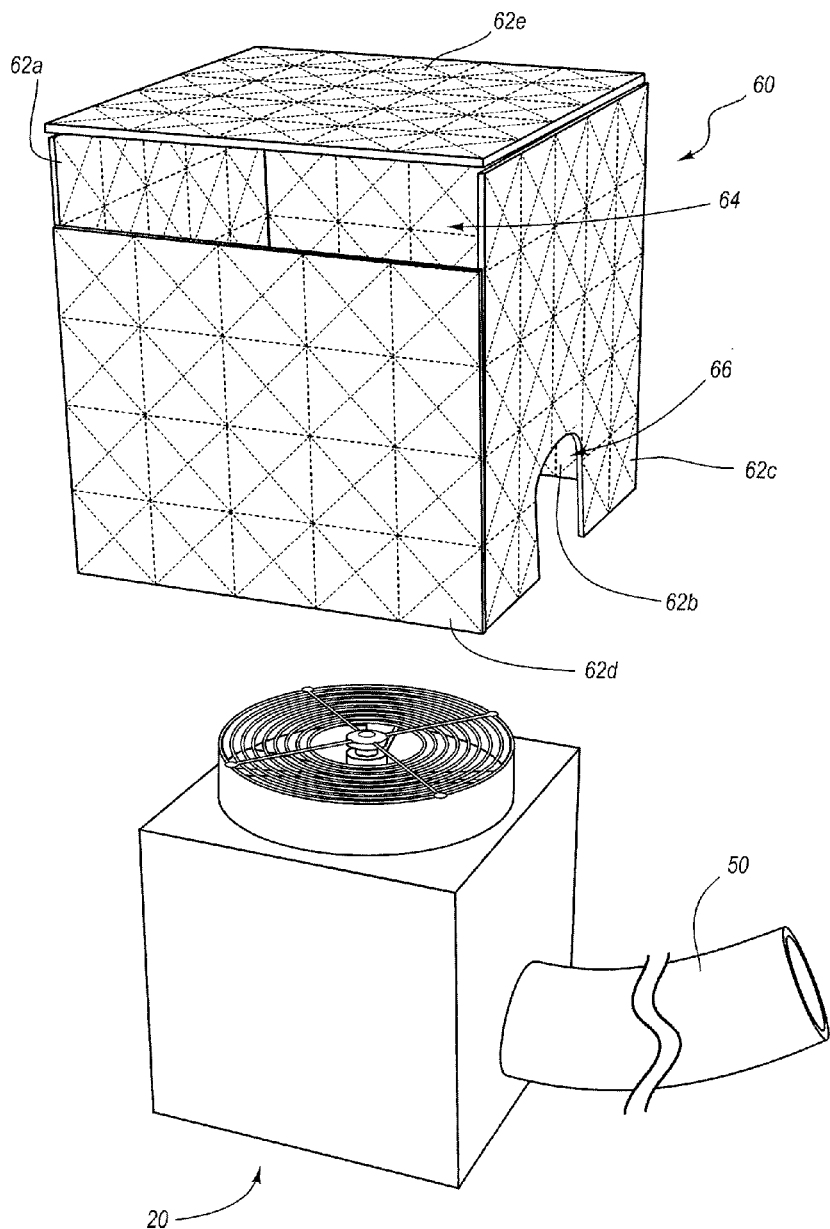
FIG. 2 illustrates a perspective view of the air blower and muffler of FIG. 1, with the muffler removed from the air blower.

A more particular illustration of some aspects of muffler 60 and air blower 20 is illustrated in FIG. 2, which illustrates muffler 60 as directly above air blower 20 just before muffler 60 is positioned over air blower 20 (or just after muffler 60 has been removed from over air blower 20).

In FIG. 2, it can be seen that muffler 60 has, in this embodiment, a generally cubic shape, although this is exemplary only. In particular, muffler 60 may have any suitable shape such as, but not limited to, cylindrical, semi-spherical, rectangular, or the like. In some embodiments, for example, the shape of muffler 60 is generally similar to that of air blower 20. For instance, in the example illustrated in FIG. 2, air blower 20 has a generally cubic shape, and muffler 60 also has a generally cubic shape. Such corresponding shapes are, however, by example only and need not be implemented for all aspects of the present invention.

More particularly, the illustrated muffler 60 has a generally cubic configuration includes four side surfaces 62a-d and a top surface 62e. In this example, a bottom surface is omitted so as to create an opening on the bottom of muffler 60. The opening allows, for example, the muffler to be easily positioned over and around air blower 20. Thus, a user could easily drop muffler 60 onto air blower 20.

It will be appreciated in view of the disclosure herein that it is not necessary, however, that air blower 30 be bottomless, or that a side be omitted or largely omitted. In other embodiments, for example, a muffler may fully enclose air blower 30, such that the air blower 30 can be positioned on a surface of the muffler and within the muffler.

As further illustrated, muffler 60 may be configured to facilitate air flow to and/or from air blower 20. For example, in the illustrated embodiment, side surfaces 62a-c each have approximately the same height. In contrast, side surface 62d has a height less than that of side surfaces 62a-c. When each of side surfaces 62a-d are placed next to each other and to top surface 62e to form a box-like configuration, shorter side 62d thus forms a window 64 acting as an air inlet to allow air to enter muffler 60. The air may be pulled, for example, by a fan or other device which causes air to be taken in by blower 20 so that it can then be output to an inflatable device or to another suitable location.

Although the illustrated embodiment shows that window 64 is formed by a shortened side surface 62d, and that window 64 is formed at a top portion of muffler 60, it will be appreciated that this is exemplary only. For example, in some cases, side surface 64d may have a height about equal to side surfaces 62a-c, but may merely have an aperture formed therein. Furthermore, in the illustrated embodiment, air blower 20 includes a fan at a top portion thereof, so it may be desirable to have window 64 at a position proximate the fan. Such is not necessary, however, and air flow may be permitted by placing a window in any of surfaces 64a-e, or even by omitting one of surfaces 64a-e. In other embodiments, air blower 64 may have an air intake on a side, bottom, or other location, in which case window 64 may optionally be positioned adjacent such air inlet.

As is further illustrated in FIG. 2, the example embodiment may also include an air outlet 66. For instance, air outlet 66 can be formed in surface 62c and allow air to be blown by air blower 20 out from inside muffler 60 and to the ambient environment, or to an inflatable device. As shown in FIG. 2, the air outlet may be configured to provide a mechanism for a tube or other connector of an inflatable device to connect with air blower 20. In this manner, as air blower 20 pushes air outward, it is carried in through the tube in the direction of the inflatable device, and thus outward through air outlet 66.

As noted above, any number of configurations are suitable for practice of aspects of the invention as disclosed herein. According to one aspect, for instance, window 64 and air outlet 66 are formed in different surfaces. In still other embodiments, window 64 and air outlet 66 may be formed in the same surfaces. In still other embodiments, a single opening may be used as an air inlet as well as an air outlet.

Additionally, muffler 66 may be sized to substantially conform to the size and shape of air blower 20. By way of example, little to no space may be left between the interior of side surfaces 62a-d and/or top surface 62e and air blower 20 when muffler 60 is placed over air blower 20. In alternative embodiments, such as that shown in FIG. 2, muffler 60 may be sized to provide some space around all or a portion of air blower 20. Some offset between air blower 20 and muffler 60 may be desirable to, for example, provide an internal space within muffler 60 in which air can rotate as it is drawn into blower 20. In another example, the size of muffler 60 as it provides space around blower 20 may act as an overheating mechanism. In particular, when air blower 20 is running, it may generate heat. Muffler 60 may be sized, however, such that the heat generated is not passed directly to muffler 60, but is instead substantially dissipated by the air around blower 20.

To facilitate such heat dissipation, the spaces can be preconfigured based on the size and/or type of blower being used. For instance, the size or placement of gaps or spaces around blower 20 and within muffler 60 can vary based on the location of an intake and/or outtake of blower 20. Thus, a gap, space, or other overheating mechanism can be positioned on a side, top, or bottom portion of muffler 60. Further, as blower 20 may have multiple intakes and/or outtakes, there may be multiple locations where gaps are formed to provide air flow and reduce the likelihood of overheating.

Muffler Construction

Figure 3:
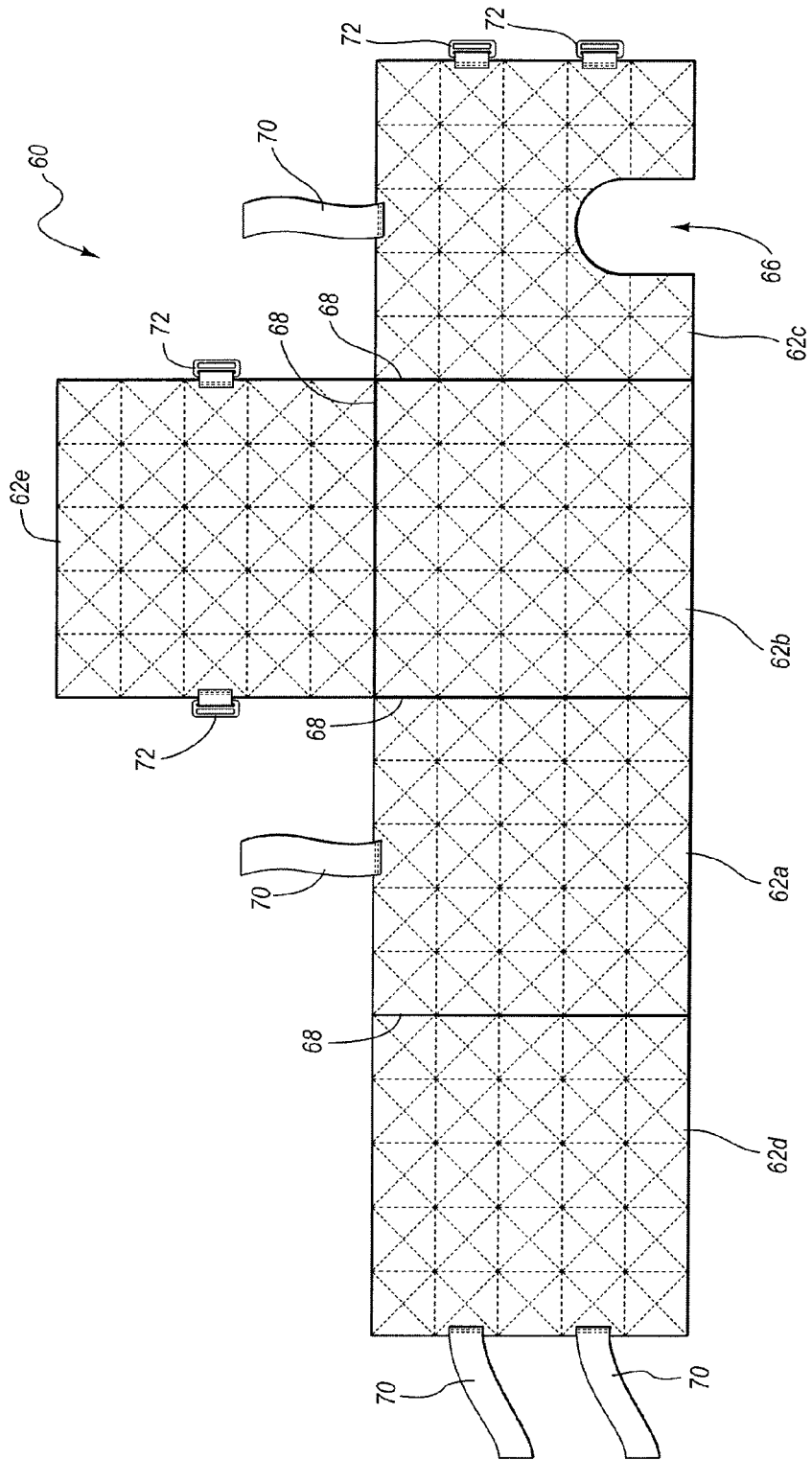
FIG. 3 illustrates an example of an unfolded muffler similar to that illustrated in FIG. 2.

As will be appreciated by one of ordinary skill in the art in view of the disclosure herein, a muffler for an air blower according to aspects of the present invention, can be constructed in any suitable manner. FIGS. 2 and 3 illustrate one example construction, but it will be appreciated that such a construction is merely exemplary and is not intended to be limiting of the present invention. Instead, the scope of the claims should be interpreted to broadly include any construction unless a specific construction is recited.

In one example, a muffler 60 is constructed in a manner that allows its shape to be modified as necessary or desired by the user. FIG. 2, for example, illustrates muffler 60 when it has been assembled to have a box-like construction, while FIG. 3 illustrates muffler 60 when it has been disassembled and has a flat construction. For example, as shown in FIG. 3, each of surfaces 62a-e may be joined together at their interfaces 68 by sewing surfaces 62a-e together. The particular embodiment illustrated in FIG. 3 includes a pattern for the box-like muffler 60 structure shown in FIG. 2. To form muffler 60 as illustrated in FIG. 2, a user may simply fold muffler 60 along interfaces 68, which interfaces then form the edges of muffler 60.

To reconfigure muffler 60 as shown in FIG. 3 into the configuration of muffler 60 of FIG. 2, and to maintain muffler 60 in the assembled configuration, any number of devices may be used. In FIG. 3, for example, a series of straps 70 and buckles 72 are connected to various of surfaces 62a-e. For instance, in the illustrated embodiment, buckles 72 are attached side surface 62c and are configured to mate with corresponding straps 70 on side surface 62d. In this manner, as muffler 60 is placed in the assembled configuration, the straps 70 on side surface 62d can mate with the buckles 72 on side surface 62c and selectively hold sides 62a-d in a box-like configuration.

In a similar manner, top surface 62e may also be selectively connected to one or more of side surfaces 62a-d. In the embodiment in FIG. 3, buckles 72 are located on top surface 62e in a manner such that they correspond to straps 70 located on side surfaces 62a and 62c. As top surface 62e is thus folded down along its interface with side surface 62b, the straps 70 on side surfaces 62a, 62ca can thus mate with buckles 72 on top surface 62e and maintain top surface 62e in place. It will thus be appreciated that muffler 60 can optionally be selectively assembled and disassembled as desired by the user. One feature of such feature is that as muffler 20 is not in use, it can be disassembled, folded up and stored in container such as a box or duffle bag.

For instance, in one example, muffler 20 may include a soft shell portion that encloses a harder core material. Optionally, the shell can fully enclose the harder material and is configured to permanently maintain the harder material within the soft shell. In such case, muffler 20 may be collapsed and disassembled by folding along each side. Alternatively, the harder material may be removable from the shell portion. In such case, the core materials inside each side of muffler 20 are optionally separate and removable. When fully removed from the shell, the shell could then be rolled-up and easily positioned within the bag or other storage container. It should be appreciated, however, that while the shell may be a soft and/or flexible material such as a nylon fabric, and the core may be a harder material such as ABS plastic, this is not limiting of the present invention. In other embodiments, the shell may be a harder material and/or the core may be a softer material. In still other embodiments, there may be no separation between a shell and core. Thus, it can be seen muffler 60 may have an exoskeleton, an endoskeleton, or any other suitable construction.

It should be appreciated that buckles 72 and straps 70 are merely one example of a mechanism that can be used to allow muffler 60 to be selectively assembled and disassembled. For instance, in other embodiments, buckles 72 and/or straps 70 may be replaced by a hook-and-loop fastener, latches, hooks, or other suitable devices. Furthermore, it is not necessary for all aspects of the invention that the surfaces even be selectively connected. For instance, all or some of surfaces 62a-e may be formed of a flexible material that allows it to be compressed even without the use of additional attachment features. Thus, all or some portions of muffler 60 may be selectively removable or detachable. For instance, in one case, top surface 62e may be the only side which includes an attachment feature for selective attachment to side surfaces 62a-d. In other embodiments, any or all of surfaces 62a-e may be completely removable, such that each surface may be completely disconnected from each other of surfaces 62a-e. Thus, any or all of surfaces 62a-e may be separate panels, or may be integrally connected to the other of surfaces 62a-e.

As will be appreciated in view of the disclosure herein, In one example, a muffler 60 is constructed in a manner that allows it to be easily removed from blower. For instance, muffler 60 may be made of lightweight materials that can be easily handled by the user. For instance, in one example, muffler 60 may have an interior formed of a sound attenuation or absorption material. For instance, any or all of surfaces 62a-e may have an interior portion that includes a sound insulation and/or an acoustic absorption material such as a foam or fibrous material. Such materials can be found that are lightweight and/or flexible and can be designed to reduce a range of sound frequencies generated by blower. Such sounds may be generated by, for example, a fan or motor in the blower, vibrations generated by the blower, air rushing in and out of the blower, or from a variety of other causes.

Using a lightweight material, a user can easily handle muffler 60, while also allowing muffler 60 to be easily folded, bent, or otherwise packed away for storage. Furthermore, muffler 60 may also be designed for additional durability. For instance, other barrier materials (which may take the form of outer coverings) may be placed on or around the sound attenuation material. By way of example, in one embodiment, a durable fabric outer covering material may be placed on one side of the sound attenuation material, or may even fully enclose the sound attenuation material. Such a fabric may include, for example, nylon or PVC-based materials that can be easily washed. Thus, even when muffler 60 is used outdoors, if it becomes soiled, muffler 60 can easily be washed without harm to the sound attenuation materials and properties of muffler 60. The fabric around the sound attenuation material can also be treated to further dampen noise from blower 20. For instance, a quilted pattern may be used to sew muffler 60 together, or other techniques may be utilized.

In view of the foregoing, it will be appreciated that a wide range of mufflers for air blowers are contemplated and encompassed within the scope of the present invention and the various aspects thereof. Additionally, while aspects of the present invention have been described with reference to an inflatable movie screen, it will be appreciated that use of a muffler according to the present invention is not so limited. For example, a muffler may be used for any air blower used to inflate any type of inflatable device. Additionally, even when an air blower is not connected to an inflatable device, a muffler according to embodiments of the present invention may be employed. For instance, the muffler may be used around at least a portion of a blower used to dry a wet surface.

Although the tubes of support structure 40 have been referenced relative to their approximate orientation, it will be appreciated that this is exemplary only. For example, it will be appreciated in view of the disclosure herein that as air is pushed into support structure 40, the air can cause support structure 40 to sway and/or twist, such that horizontal tubes 42a and 42b may oscillate and move around a horizontal position, while vertical tubes 42c and 42d can also sway and twist around a vertical position. Further, as system 10 is optionally configured for outdoor use, wind or other environmental factors may also cause it to sway such that its orientation is not always fixed. In still other embodiments, support structure 40 may have other configurations, such as trapezoidal, circular, square, etc., such that it is also not necessary that support structure 40 have a generally rectangular structure.

In general, tubes 42a-d may be configured to have an open channel therein, such that as air enters inlet 50, air may flow around structure 40 and into and/or out of any of tubes 42a-d. In one example, for instance, tubes 42a-d may be formed of a fabric material and are sewn together such that support structure is substantially hollow to permit air flow therein.

Support structure 40 may thus include one or more inflatable tubes 42a-d or other inflatable portions. Support structure 40 is therefore, in this example, inflatable. Nevertheless, although support structure 40 is inflatable, it may also include other features or components which are not necessarily inflatable. For example, as shown in FIGS. 1 and 2, support structure 40 can also include one or more tethers 46 to facilitate maintaining screen system 10 in a standing position.

Tethers 46 can be attached to support structure 40 in any suitable manner. For example, in the illustrated embodiment, a ring 44 is sewn to, or otherwise attached to substantially vertical tube 42d, and a corresponding ring (not shown) is attached to substantially vertical tube 42c. Tethers 46, which may be tie-down ropes, cords, or any other suitable structure, are then connected to ring 44 and extended at an angle towards the ground. Tethers 46 may there be attached to a stake which is placed in the ground, attached to a weight, or otherwise secured to the ground.

In the example embodiment, four tethers 46 are illustrated, and the use of two rings 44 is suggested. It will be appreciated that this is exemplary only, and that other configurations and numbers of tethers 46, rings 44 or additional support structures may be utilized. although this is exemplary only. For example, in another embodiment, four rings 44 are attached to support structure 40 (e.g., two near the top of screen 30 and two near the bottom of screen 30). Eight total tethers 46 may thus extend from rings 44 to help sustain inflatable screen system 10 in an upright position. In still other embodiments, rings 44 and/or tethers 46 may be placed at about a bottom of support structure 40, at a mid-point of screen 30, or at any other location on or near support structure 40.

Tethers 46 may further be secured to the ground or otherwise secured in place before, during and/or after inflation of screen system 10. As will be appreciated, tethers 46 may extend from support structure at any number of angles and still reach the ground and be able to support screen system 10 in an upright configuration. According to one embodiment, tethers 46 may be preconfigured such that when placed at specific measurements, prior to inflation, screen system 10 may inflate without any human assistance. Such measurements will, however, vary based on the size of screen system 10, such that no particular measurements are preferred. Nevertheless, it will be appreciated that for any number of sizes of system 10, such dimensions can be readily calculated or measured. At such measurements, tethers 46 can facilitate pulling of screen system 10 into a standing position as it inflates.

According to one aspect of the invention, screen system 10 is configured to continually receive air from blower 20 throughout all, or substantially all, of the use of screen system 10. When blower 20 is turned off, support structure 40 may then begin to automatically deflate. When deflated, support structure 40 and optionally screen 30, can be packaged together and put in a box, duffle bag, or other container so that it can be easily moved between locations.

To facilitate deflation, one or more openings may be formed in tubes 42a-d or in other locations of support structure 40. In the illustrated embodiment, a zipper-enclosed opening may be positioned near the upper corner of tube 42d. Such an opening can operate as a vent to hold air when the zipper is closed (e.g., during use of screen system 10), and to release air when the zipper is opened (e.g., after use of screen system 10, when blower 20 is turned off).

As will be appreciated in view of the disclosure herein, while inflatable screen system 10 may be configured to operate with the continuous flow of air during use, it may alternatively be configured as a closed-air system. For example, support structure 40 and inlet 50 may be sealed to substantially reduce the amount of air flowing out of support structure 40. A user may then turn off blower 20 when support structure 40 is sufficiently inflated, or blower 20 may be configured with a sensor to automatically turn off at a particular pressure. Depending on the amount of air lost in the system 10, blower 20 may then remain off during use of inflatable screen system 10, or may need to be temporarily restarted to replace lost air.

The foregoing discussion of the illustrated embodiments is merely exemplary, and no feature is considered necessary unless specifically recited as such. Indeed, each element may be alternatively configured. For example, while the embodiment of FIG. 1 illustrates a system 10 having only tubes 42a-d as being inflatable, this may also be exemplary or only a partial component of the inflatable support.

Figure 4:
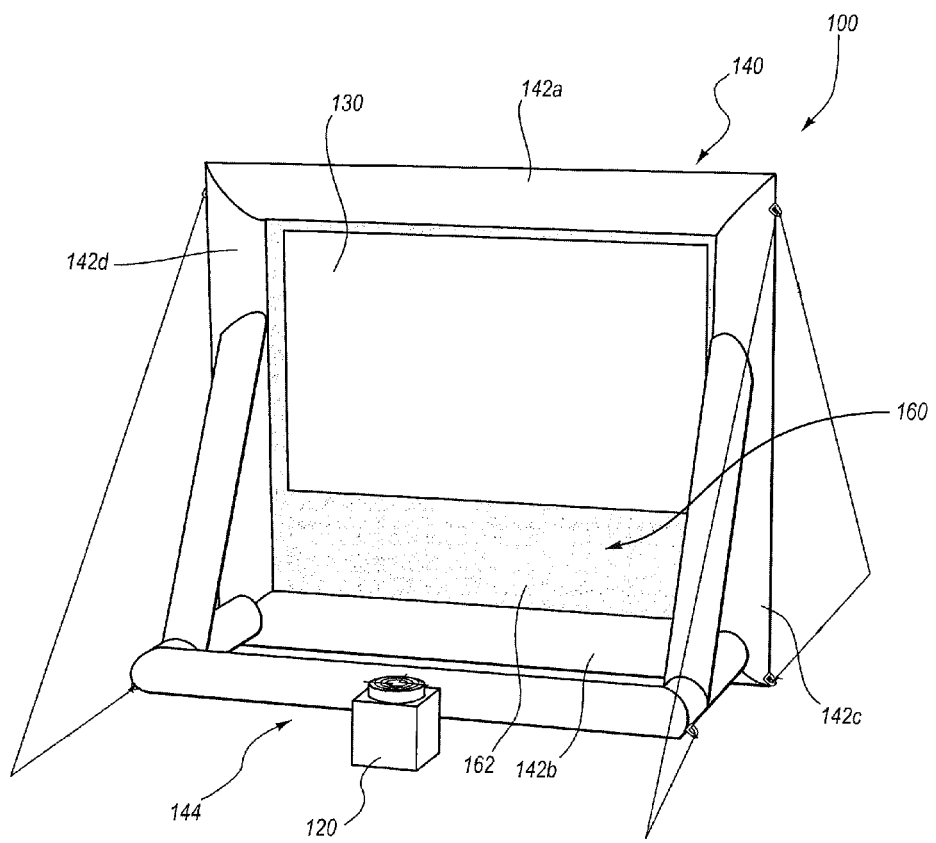
FIG. 4 illustrates a rear perspective view of an inflatable movie screen system according to another embodiment.

For example, FIG. 4 illustrates an alternative embodiment in which an inflatable screen system 100 is illustrated as having a support structure 140, screen 130 and blower 120. In the illustrated embodiment support structure 140 includes tubes 142a-d forming a rectangular frame around screen 130. Additionally, however, support structure 140 also includes an inflatable upright support 144. Such an upright support 144 may, for example, allow inflatable system 100 to be maintained in an upright position without or with a reduced number of tethers, tie-downs, or similar devices. In other embodiments, however, such structures may optionally be included in addition to upright support 144.

In embodiments which include an upright support 144, any suitable support structure may be used. In the illustrated embodiment, for instance, an A-frame type upright support 144 is used. In other embodiments, however, upright support 144 may instead include supports directly under bottom tube 142d, for example.

Internal Tensioning

According to some aspects of the present invention, inflatable screen system 10 includes an internal tensioning mechanism, so that tension can be applied to screen 30 automatically, and without requiring user intervention. As used herein, in both the description and the claim appended hereto, the term "internal tension" shall be used to refer to mechanisms of the inflatable screen system that cause the inflatable support structure to stretch and support a screen with the mere addition of air to the inflatable support structure. Accordingly, a "fully internal tension" on a screen shall refer to the ability of a screen to rely solely on the addition of air to provide a desired amount of tension to the inflatable support, and without the use of any external or removable tension mechanisms.

Returning to FIG. 1, a description of an internal tension mechanism 60 suitable for use with some embodiments of the present invention is further described. Such a mechanism 60 may, for example, allow for the inflatable screen system 10 to be inflated and to automatically create tension in screen 10 to reduce and potentially eliminate wrinkles viewed on screen 10 and which can disrupt the display of media or another presentation thereon. In some cases, internal tension mechanism 60 may allow for tension to be applied to screen 30 and be self-correcting so that as pressure builds up in one location, thereby causing pressure to be applied to that location, the pressure is then automatically distributed elsewhere within support structure 40 to apply the pressure approximately equally throughout tubes 42a-d and ultimately to screen 30.

In particular, in the illustrated embodiment, internal tension mechanism 60 includes a skirt 62 and that is coupled to support structure 40. In the illustrated embodiment, for instance, skirt 62 is positioned near the bottom of support structure 40, and is, more particularly, connected to the bottom of screen 30 and to the outer surface of bottom tube 42b. The left and right sides of skirt 62 are then attached to left tube 42c and to right tube 42d, respectively, to thereby fill the area of inflatable screen system 10 that is immediately below screen 30.

The remaining portions of screen 30 (i.e., the left, right, and top sides) can then be connected directly to tubes 42a, 43c, and 42d. In particular, in the embodiment illustrated in FIG. 1, the left side of screen 30 is connected directly to the upper portion of left tube 42c, the top side of screen 30 is connected directly to top tube 42a, and the right side of screen 30 is connected directly to the upper portion of right tube 42d.

Any suitable type of connection between screen 30, tubes 42a, 42c and 42d, and skirt 62 may be used. In one example, screen 30 is attached to each of tubes 42a, 42c and 42d, and skirt 62 directly by sewing screen 30 thereto. In this manner, screen 30 may therefore be substantially non-removable and substantially permanently secured thereto. In another aspect, screen 30 may be affixed using an adhesive, or another mechanism for substantially permanently securing screen 30 to support structure 40 and/or skirt 40. Skirt 40 may also be connected to tubes 42b-d in a similar manner.

As air enters support structure 40, pressure may initial build-up unevenly. For example, when the blower starts, the air pressure near inlet 50 may be greater than at an opposing corner. As the air continues, the air will start to flow throughout the entire support structure, and air pressure will tend to approximately equalize throughout the system 10. As that air pressure equalizes, the air will cause about an equal amount of pressure along the points within support structure 40 at which skirt 62 and screen 30 are connected to tubes 42a-d. In this manner, as air flows through inflatable screen system 10, tubes 42a-d will pull directly on the sides and top of screen 30, and on the sides and bottom of skirt 62. Skirt 62 will, in turn, pull on the bottom of screen 30. As screen 30 is sewn or otherwise connected to skirt 62 and support structure 40 at numerous locations (e.g., there may be thousands or tends of thousands of stitches), the about constant pressure around support structure can cause an approximately equal amount of pressure at all locations, to thereby pull screen 30 into an almost perfect rectangular shape.

Notably, the ability to thereby pull in all directions at once, with about equal pressure, is a clear distinction from prior systems which use a few, discrete locations to affix separate connection and/or tension mechanisms. Thus, as described previously, while one system may utilize multiple straps, the tension applied by one strap may differ from that at another strap, so that the screen has a tendency to deform from its rectangular shape.

Thus, embodiments of the present invention can eliminate the need for external or other removable tension systems by utilizing air flow as an internal mechanism for regulating the tension applied to screen 30. More particularly, because air pressure within tubes 42a-d may tend to pull on screen 30 at substantially equal amounts in all directions, tension applied to screen 30 is internal, and caused by mere inflation of support structure 40. In other words, tension on screen 30 is fully internal and directly regulated by inflation of inflatable screen system 10.

It should be appreciated that the embodiment in FIGS. 1 and 2 is merely one example of an inflatable screen system 10 that has internal tension mechanisms according to aspects of the present invention, and that other embodiments are also contemplated. For example, while skirt 62 is illustrated as being connected to one side of screen 30, this feature is exemplary only. In other embodiments, for instance, tubes 42a-d may form a rectangular with an opening substantially the size of screen 30, so that skirt 62 is not necessary. In still other embodiments, skirt 62 may be used and connected to top tube 42a, left tube 42c and/or right tube 42d.

One reason for using skirt 62 may be to increase the height of screen 30. In particular, when bottom tube 42b is positioned on the ground, it may be desirable to elevate screen 30 above the ground so that it can be more easily viewed by a number of people. Such is not always the case, however, and in some cases screen 30 may be positioned directly next to bottom tube 42b which is on the ground. In other cases, additional supports—whether inflatable or not—may be included. For instance, a structure may be positioned under bottom tube 42b, so that it is elevated off the ground and skirt 62 need not be used, and a direct connection between screen 30 and each of tubes 42a-d is instead used for placing fully internal tension on screen 30.

Returning now to FIG. 4, another example of an internal tension mechanism 160 is illustrated. In this embodiment, internal tension mechanism 160 also utilizes a skirt 162; however, skirt 162 is positioned fully around screen 130. In such a case, skirt 162 may be directly connected to each of tubes 142a-d, as well as to a corresponding side of screen 130. In this manner, as tubes 142a-d receive air therein, they can pull on skirt 162, which in turn pulls evenly around screen 130 to the rectangular shape of screen 130, and to place it under fully internal tension.

Manufacturing Materials

As will be appreciated in view of the disclosure herein, any number of materials may be used for the various components of the example embodiments, or for other components according to other aspects of the present invention. For instance, according to one embodiment, support structure 40 or 140 may be made of a PVC or nylon material. In one example, support structures 40, 140 may be made from 210 Denier Nylon Oxford Cloth and can optionally have a coating, such as with Urethane. One feature of such materials is that they are lightweight as well as durable. With such materials, support structures 40, 140 can have their weight reduced well below standard weights for a similar sized inflatable screen as previously configured. This allows the screen to not only be more easily transported.

The screen 30, 130 that forms the projection surface may also be made from the same or a different material as the support structure. Thus, screens 30, 130 may also be made of a PVC or nylon material. In another embodiment, screens 30, 130 may be formed of a polyester material, such as spandex. Such a material may, for example, facilitate stretching when internal tension is applied.

To facilitate stretching of the screens 30, 130 to a desired size when placed under fully internal tension, materials used for screens 30, 130 may also be pre-measured, pre-stretched, and the like. When such materials are, for example, pre-stretched to a predetermined size, and then sewn to the rectangular frame and/or skirt, when the fully internal tension is applied, the screen will stretch exactly the amount desired and to exactly the desired shape.

In general, screens 30, 130 may also be manufactured from a single piece of material, and without seams, except for a seam where screens 30, 130 may be sewn to tubes 42a-d, 142a-d and/or skirts 62, 162. Screens 30, 130 may therefore be a single piece of fabric that is not inflatable, is light in color (e.g., white, so as to facilitate use as a projection screen), and may be sewn directly into the support structures 40, 140 so that it is not easily removable, is not easily replaceable, and/or is not modular in construction or design. Thus, unlike prior systems which had the specific design of making the screen removable from the support structure, thereby allowing the user to add tension to the screen when necessary, because embodiments of the present invention can provide fully internal tensioning that automatically tensions the screen upon merely inflating the support structure, the screen need not be removable. Furthermore, because the screen can be made of nylon, PVC or other cleanable materials, it can easily be washed in the same manner as the attached support structure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An inflatable movie screen system, comprising:
    an inflatable support structure;
    a projection surface coupleable to said inflatable support structure,
    a skirt coupled to said projection surface and said inflatable support structure, wherein said projection surface is internally tensioned by said skirt such that the projection surface automatically tensions upon inflation of the inflatable support structure;
    an air inlet coupled to said inflatable support structure and configured to receive air for inflation of said inflatable support structure;
    an air blower coupleable to said air inlet; and
    a muffler configured to be positioned around at least a portion of said air blower and to dampen sound generated by said air blower, said muffler comprising:
    a plurality of surfaces comprising a top surface and a plurality of side surfaces, said surfaces at least partially defining an interior space configured to selectively house at least a portion of said air blower;
    a sound attenuation outer covering material covering at least a portion of said surfaces, the sound attenuation outer covering material having a noise dampening treatment that dampens the sound output from said air blower; and
    an opening defined between said top surface and an upper edge of at least one of said side surfaces, the opening allowing for the flow of air between an environment external to said muffler and said air blower, such that air from the external environment passes through said opening to said air blower.

2. The inflatable movie screen system of claim 1, wherein said muffler includes at least one of a soft material or a flexible material such that said muffler in a storage configuration is rolled-up and positioned within a bag or storage container.

3. The inflatable movie screen system of claim 1, wherein said muffler further comprising:
    said opening being positioned proximate to a fan of an air inlet of the blower.

4. The inflatable movie screen system of claim 1, wherein said air blower is configured to provide continuous air to said inflatable support structure through said air inlet when said projection surface is used, and wherein said air blower is selectively detachable from said air inlet.

5. The inflatable movie screen system of claim 1, wherein said opening being configured to facilitate air flow into an interior of said muffler and to said air blower.

6. The inflatable movie screen system of claim 1, wherein said skirt is disposed between a portion of said projection surface and said inflatable support, and wherein said skirt and inflatable support are configured such that as air is supplied to said inflatable support, said inflatable support and said skirt automatically provide fully internal tension to said projection surface.

7. An inflatable movie screen system, comprising:
    an inflatable support structure;
    a projection surface coupleable to said inflatable support structure,
    a skirt coupled to said projection surface and said inflatable support structure, wherein said projection surface is internally tensioned by said skirt such that the projection surface automatically tensions upon inflation of the inflatable support structure;

an air inlet coupled to said inflatable support structure and configured to receive air for inflation of said inflatable support structure;

an air blower coupleable to said air inlet; and a muffler configured to be positioned around at least a portion of said air blower and to dampen sound generated by said air blower, said muffler comprising:

a plurality of surfaces comprising a top surface and a plurality of side surfaces, each surface having opposing inner and outer faces;

a sound attenuation outer covering material covering at least a portion of said surfaces, the sound attenuation outer covering material including a sound attenuation or absorption material configured to dampen the sound output from said air blower; and said muffler being movable between an assembled configuration, wherein said inner faces of said surfaces at least partially define an interior space configured to selectively house at least a portion of said air blower, and a storage configuration wherein said surfaces have a substantially flattened construction.

* * * * *